United States Patent
Moon et al.

(10) Patent No.: US 6,778,238 B2
(45) Date of Patent: Aug. 17, 2004

(54) REFLECTIVE LIQUID CRYSTAL DISPLAY DEVICE USING A CHOLESTERIC LIQUID CRYSTAL COLOR FILTER

(75) Inventors: Jong-Weon Moon, Annyang-si (KR); Sunghoe Yoon, Annyang-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 84 days.

(21) Appl. No.: 10/073,888

(22) Filed: Feb. 14, 2002

(65) Prior Publication Data

US 2002/0135719 A1 Sep. 26, 2002

(30) Foreign Application Priority Data

Feb. 14, 2001 (KR) .......................................... 2001-7321

(51) Int. Cl.[7] ...................... G02F 1/1335; G02F 1/1347
(52) U.S. Cl. ...................... 349/106; 349/115; 349/110; 349/117; 349/176
(58) Field of Search ................................ 349/106, 110, 349/115, 178, 117, 98, 43, 143, 176

(56) References Cited

U.S. PATENT DOCUMENTS

| 5,555,114 A | * | 9/1996 | Narita et al. .................. 349/98 |
| 5,724,109 A | * | 3/1998 | Nakamura et al. ............. 349/79 |
| 6,025,899 A | * | 2/2000 | Fukunaga et al. ........... 349/115 |
| 2003/0020855 A1 | * | 1/2003 | Lee .............................. 349/115 |

FOREIGN PATENT DOCUMENTS

KR 2000-0061782 10/2000

* cited by examiner

*Primary Examiner*—Toan Ton
*Assistant Examiner*—Tai Duong
(74) *Attorney, Agent, or Firm*—McKenna Long & Aldridge

(57) ABSTRACT

A reflective liquid crystal display device includes first and second substrates facing and spaced apart from each other; a first transparent electrode beneath the first substrate; a light absorption layer on the second substrate; a cholesteric liquid crystal (CLC) color filter layer on the light absorption layer, the CLC color filter layer being multi-layered and each layer of the CLC color filter including sub-color filters for red, green and blue colors arranged in an alternating order; a second transparent electrode on the CLC color filter layer; and a liquid crystal layer interposed between the first and second transparent electrodes. The CLC color filter layer may be single-layered and each sub-color filter may include a plurality of regions having a different central wavelength of reflection. The CLC color filter layer may be multi-layered with each sub-color filter including a plurality of regions having a different central wavelength of reflection.

18 Claims, 5 Drawing Sheets

REFLECTIVE LIQUID CRYSTAL DISPLAY DEVICE USING A CHOLESTERIC LIQUID CRYSTAL COLOR FILTER

This application claims the benefit of Korean Patent Application No. 2001-7321, filed on Feb. 14, 2001, which is hereby incorporated by reference as if fully set forth herein.

BACKGROUND OF THE INVENTION

1. Field of the Invention

The present invention relates to a reflective liquid crystal display (LCD) device, and more particularly, to a reflective LCD device using a cholesteric liquid crystal color filter.

2. Discussion of the Related Art

Generally, thin film transistor-liquid crystal displays (TFT-LCDs) with high color quality and small depth dimension are mainly being used as LCDs.

Conventional LCD devices include a first substrate and a second substrate with a liquid crystal layer interposed therebetween. The first substrate and the second substrate are generally referred to as a color filter substrate and an array substrate, respectively.

The LCD devices use backlight sources disposed over the outer surface of the second substrate to provide light. However, only about 7% of the light that is emitted by the backlight passes through each cell of the LCD device. Since the backlight should emit light of a relatively high brightness, corresponding power consumption increases. Accordingly, a large capacity heavy battery is commonly used to supply sufficient power for the backlight. Moreover, use of the large capacity battery limits operating time.

Recently, to solve the above-mentioned problems, reflective LCD devices without the backlight are being researched and developed. Because power consumption of reflective LCD devices greatly decreases due to use of ambient light as a light source, operating time increases. Such reflective LCD devices are used for portable information apparatuses such as electric diaries and personal digital assistants (PDAs). In reflective LCD devices, a pixel area, which is covered with a transparent electrode in conventional transmissive LCD devices, is covered with a reflective plate or reflective electrode having opaque reflection characteristics. However, brightness of reflective LCD devices is very poor because the devices use only ambient light as a light source. The poor brightness results from operational characteristics of the reflective LCD devices in which ambient light passes through a color filter substrate, is reflected on a reflective electrode on a second substrate, passes through the color filter substrate again and then displays an image. Accordingly, brightness is decreased as a result of reduction of the transmittance when the ambient light passes through a color filter layer twice. Since overall thickness of the color filter layer is inversely proportional to transmittance and is directly proportional to color purity of the light, the problem of inadequate brightness of the reflective LCD devices can be remedied by forming a thin color filter layer with high transmittance and low color purity. However, there is a limit in fabricating the color filter layer below a threshold thickness due to characteristics of the resin used to form the color filter layer.

Accordingly, one possible solution to this problem is forming LCD devices using cholesteric liquid crystal (CLC) having selective reflection and transparency characteristics.

Generally, liquid crystal molecules have liquid crystal phases according to their structure and composition. The liquid crystal phases depend on the temperature and the concentration. Nematic liquid crystal material in which the liquid crystal molecules are aligned along one direction is mainly being researched and applied. Especially, the nematic liquid crystal material is nowadays being applied to the commercialized LCD. The CLC has an alignment state that the director of the nematic liquid crystal is distorted by mixing the nematic liquid crystal and the molecule whose molecular axis is distorted or whose reflected molecular phase has a different chiral characteristic from its original molecular phase.

The nematic liquid crystal phase has regularity that the liquid crystal molecules are aligned along one direction. In contrast with the nematic liquid crystal, the CLC has a structure of multi-layers, in each layer of which the liquid crystal has the regularity of the nematic liquid crystal. However, the liquid crystal alignment between the layers rotates, thereby the reflectance between layers being different. Therefore, the difference of the reflectance can display colors by reflection and interference of the light.

The rotation of the CLC molecule can be understood as a kind of helical structure. Two characteristics of the helical structure are a direction of rotation and a pitch that is repetition period of the helical structure.

The pitch can be understood as a distance through which the liquid crystal layer has the same alignment and is a variable to determine the color of the CLC. The central wavelength of the reflected light can be expressed the multiple of the pitch and the average refractive index ($\lambda_c = n_{avg} \cdot p$). For example, if the pitch of the CLC whose average refractive index is 1.5 is 430 nm, the central wavelength of the reflected light is about 650 nm, thereby the reflected light being red. Similarly, green and blue can be displayed by making the CLC have an adequate pitch.

In the CLC structure, another important characteristic is the direction of the rotation, which is an important element to make polarization in the reflection characteristic of the CLC. The direction of circular polarization of the reflected light is determined according to direction of the helical structure of the CLC, i.e., left-handed or right-handed helical structure. For example, the CLC of the right-handed helical structure reflects the right-handed circular polarized light having the corresponding pitch.

The ambient light can be considered as a sum of the right-handed and left-handed circular polarized lights, and a specific circular polarized light can be divided by using the CLC. In the conventional LCD devices, the polarization (linear polarization) property is used. In the LCD devices using the CLC, since the practical use of the light is improved in contrast with the color filter using conventional pigments or dyes, the power consumption can be effectively decreased.

FIG. 1 is a schematic cross-sectional view of a conventional reflective LCD device using a CLC color filter.

A first substrate 10 and a second substrate 30 are facing and spaced apart from each other, and a liquid crystal layer 50 is interposed between the first and second substrates 10 and 30. On an inner surface of the first substrate 10, a first transparent electrode 12, which is a first electrode for applying a voltage to the liquid crystal layer 50, is formed. On the outer surface of the first substrate 10, a quarter wave plate (QWP) 14, that is, a λ/4 retardation plate converting linearly polarized light into right- or left-handed circularly polarized light and conversely converting right- or left-handed circularly polarized light into linearly polarized light, is formed. Then, a polarizing plate 16 through which only light coinciding with the polarizing axis of the polarizing plate 16 can be transmitted is disposed on the QWP 14. Over an inner surface of the second substrate 30, a CLC color filter layer 32, which selectively reflects light of corresponding wavelength and transmits light of the other wavelength, is formed. The CLC color filter layer 32 composes a pixel "P" including three sub-pixels "S" of red (R), green (G) and blue (B). A light absorption layer 34 absorbing the transmitted light through the CLC color filter layer 32 is interposed between the CLC color filter layer 32 and the second substrate 30. A second transparent electrode 36, which is a second electrode for applying a voltage to the liquid crystal layer 50, is formed on the CLC color filter layer 32.

Accordingly, since the CLC color filter layer 32 not only displays colors but also reflects light, an additional reflecting plate is not necessary. As the reflecting plate much affects the reflective brightness in the reflective LCD device including the reflecting plate, so the CLC color filter layer affects the reflective brightness in the reflective LCD device using the CLC color filter.

FIG. 2 is a graph showing reflectance's difference between conventional reflective LCD devices using a reflecting plate and a CLC color filter.

In FIG. 2, x-axis and y-axis represent wavelength and reflectance, respectively. T1, T2 and T3 are reflectance curves of the conventional reflective LCD device using the reflecting plate according to the colors R, G and B, respectively. The central wavelengths of T1, T2 and T3 are about 460 nm, 550 nm and 640 nm, respectively. The reflectance at each central wavelength of T1, T2 and T3 is about 0.95 and the difference between central wavelengths of T1, T2 and T3 is about 90 nm. C1, C2 and C3 are reflectance curves of the reflective LCD device using the CLC color filter without the reflecting plate according to the colors R, G and B, respectively. The central wavelengths of C1, C2 and C3 are nearly the same as those of T1, T2 and T3. However, the each bandwidth of C1, C2 and C3 is about 60 nm and the reflectance at each central wavelength of C1, C2 and C3 is about 0.5. That is to say, C1, C2 and C3 are narrower and lower than T1, T2 and T3. Therefore, the average reflectance of the reflective LCD device using the CLC color filter only has a range of about 0.1 to 0.15, while the reflectance of the conventional reflective LCD device using the reflecting plate is about 0.3.

On the other hand, for an absorptive color filter of the conventional reflective LCD device using the reflecting plate, since the thickness of the absorptive color filter is inversely proportional to the transmittance and proportional to the color purity, the transmittance and the color purity can be controlled by adjusting the thickness of the absorptive color filter layer. However, for the CLC color filter, the pitch of the CLC color filter is determined for the desired wavelength when the CLC color filter is designed and the bandwidth of reflectance curve for the CLC color filter is determined by the multiple of refractive index anisotropy of the CLC ($\Delta n = n_e - n_o$) and the pitch (p), i.e. $\Delta\lambda = \Delta n \cdot p$. Therefore, after the CLC is completely aligned, each bandwidth for the colors R, G, and B is determined only by material property of the CLC. Additionally, since the reflectance of the CLC color filter varies according to the thickness of the CLC color filter, the thickness of the CLC color filter would be within a range of 2 to 5 micrometers for enough reflectance at each central wavelength. Consequently, for the CLC color filter different from the color filter of the conventional reflective LCD device, the reflective brightness cannot be controlled by the thickness of the CLC color filter.

The methods to increase the reflective brightness of the mono-layered CLC color filter can be divided into two types. The first method is to make the CLC incompletely aligned and the second method is to mix materials with different reaction properties and control the diffusion and reaction rate between the materials. By the methods, the bandwidth of the reflectance curve becomes wider so that the color purity can be decreased and the reflective brightness can be increased. For the first method, the reflectance at the central wavelength is decreased so that the increase in reflective brightness is not adequate. For the second method, each CLC color filter of colors R, G and B is very difficult to form in the color filter process because of the reaction mechanism of the CLC color filter.

Consequently, since the reflective LCD device using the mono-layered CLC color filter selectively reflects light of corresponding wavelength and transmits light of the other wavelengths, the color purity is high but the reflective brightness is low in contrast with the reflective LCD device using the reflecting plate.

SUMMARY OF THE INVENTION

Accordingly, the present invention is directed to a reflective liquid crystal display device that substantially obviates one or more of problems due to limitations and disadvantages of the related art.

An advantage of the present invention is to provide a reflective liquid crystal display device in which a cholesteric liquid crystal (CLC) color filter layer is multi-layered and has sub-color filters for red, green and blue colors to improve display quality by increasing a reflective brightness of a cholesteric liquid crystal color filter.

Another advantage of the present invention is to provide a reflective liquid crystal display device in which a cholesteric liquid crystal (CLC) color filter layer has sub-color filters for red, green and blue colors and each of the sub-color filters is divided into a plurality of regions to improve a display quality by increasing a reflective brightness of a cholesteric liquid crystal color filter.

Another advantage of the present invention is to provide a reflective liquid crystal display device in which a cholesteric liquid crystal (CLC) color filter layer is multi-layered and each layer of the cholesteric liquid crystal (CLC) color filter layer has sub-color filters for red, green and blue colors and each of the sub-color filter is divided into a plurality of regions to improve a display quality by increasing a reflective brightness of a cholesteric liquid crystal color filter.

Additional features and advantages of the invention will be set forth in the description that follows, and in part will be apparent from the description, or may be learned by practice of the invention. These advantages and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device comprises first and second substrates facing and spaced apart from each other; a first transparent electrode beneath the first substrate; a light absorption layer on the second substrate; a cholesteric liquid crystal color filter layer on the light absorption layer, the cholesteric liquid crystal color filter layer being multi-layered and each layer of the cholesteric liquid crystal (CLC) color filter including sub-color filters for red, green and blue colors arranged in an alternating order; a second transparent electrode on the cholesteric liquid crystal color filter layer; and a liquid crystal layer interposed between the first and second transparent electrodes. The reflective liquid crystal display device of the present invention further includes a plurality of thin film transistors, which correspond respectively to each of the sub-color filters and are connected to the corresponding first transparent electrode, beneath the first substrate and a passivation layer beneath the thin film transistor and the first substrate. However, the plurality of thin film transistors, which correspond respectively to each of the sub-color filters, may alternatively be formed on the second substrate and connected to the corresponding second transparent electrode. The reflective liquid crystal display device of the present invention further includes a quarter wave plate on the first substrate and a polarizing plate on the quarter wave plate. The multi-layered cholesteric liquid crystal (CLC) color filter layer consists of at least two layers.

In another aspect, a reflective liquid crystal display device comprises first and second substrates facing and spaced apart from each other; a first transparent electrode beneath the first substrate; a light absorption layer on the second substrate; a cholesteric liquid crystal color filter layer on the light absorption layer, the cholesteric liquid crystal color filter layer including sub-color filters for red, green and blue colors arranged in an alternating order, each of the sub-color filters being divided into a plurality of regions; a second transparent electrode on the cholesteric liquid crystal color filter layer; and a liquid crystal layer interposed between the first and second transparent electrodes. The reflective liquid crystal display device of the present invention further includes a plurality of thin film transistors, which correspond respectively to each of the sub-color filters and are connected to the corresponding first transparent electrode, beneath the first substrate and a passivation layer beneath the thin film transistor and the first substrate. However, the plurality of thin film transistors, which correspond respectively to each of the sub-color filters, may alternatively be formed on the second substrate and connected to the corresponding second transparent electrode. The reflective liquid crystal display device of the present invention further includes a quarter wave plate on the first substrate and a polarizing plate on the quarter wave plate. Each regions of the sub-color filters having a different central wavelength of reflection. The central wavelength of reflection for red color is between 620 and 650 nm, for green color between 530 and 570 and for blue color between 440 and 480.

In another aspect, a reflective liquid crystal display device comprises first and second substrates facing and spaced apart from each other; a first transparent electrode beneath the first substrate; a light absorption layer on the second substrate; a cholesteric liquid crystal color filter layer on the light absorption layer, the cholesteric liquid crystal color filter layer being multi-layered and each layer of the cholesteric liquid crystal (CLC) color filter layer including sub-color filters for red, green and blue colors arranged in an alternating order, each of the sub-color filters being divided into a plurality of regions; a second transparent electrode on the cholesteric liquid crystal color filter layer; and a liquid crystal layer interposed between the first and second transparent electrodes. The reflective liquid crystal display device of the present invention further includes a plurality of thin film transistors, which correspond respectively to each of the sub-color filters and are connected to the corresponding first transparent electrode, beneath the first substrate and a passivation layer beneath the thin film transistor and the first substrate. However, the plurality of thin film transistors, which correspond respectively to each of the sub-color filters, may alternatively be formed on the second substrate and connected to the corresponding second transparent electrode. The reflective liquid crystal display device of the present invention further includes a quarter wave plate on the first substrate and a polarizing plate on the quarter wave plate. The multi-layered cholesteric liquid crystal (CLC) color filter layer consists of at least two layers. Each regions of the sub-color filters having a different central wavelength of reflection. The central wavelength of reflection for red color is between 620 and 650 nm, for green color between 530 and 570 and for blue color between 440 and 480.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

The premise to improve the reflective brightness will be illustrated with the following graph.

Figure 1:
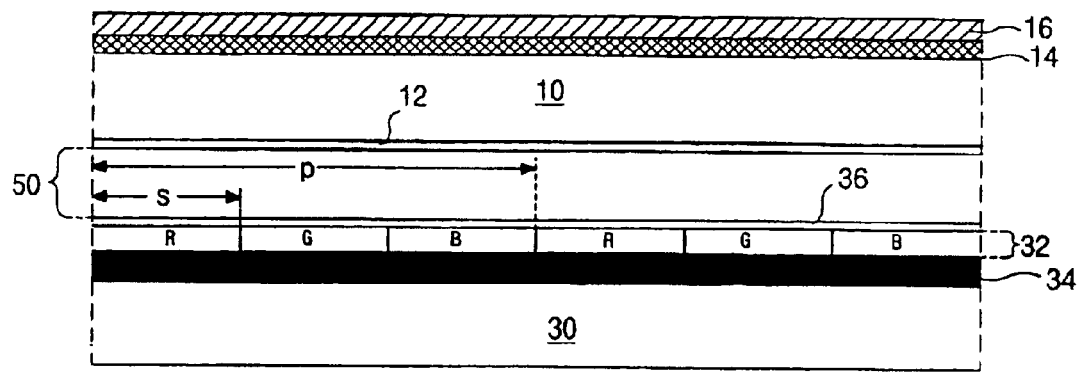
FIG. 1 is a schematic cross-sectional view of a conventional reflective LCD device using a CLC color filter.
Figure 2:
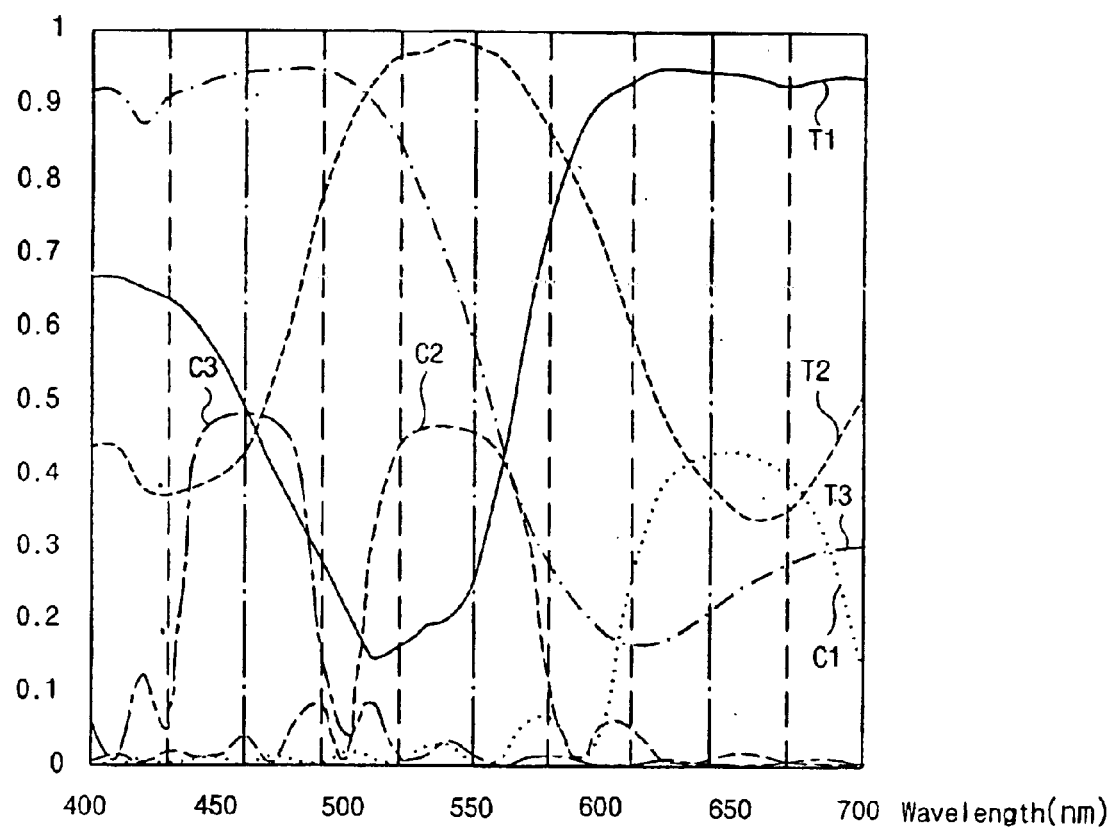
FIG. 2 is a graph illustrating difference in reflectance between conventional reflective LCD devices using a reflecting plate and a CLC color filter.
Figure 3:
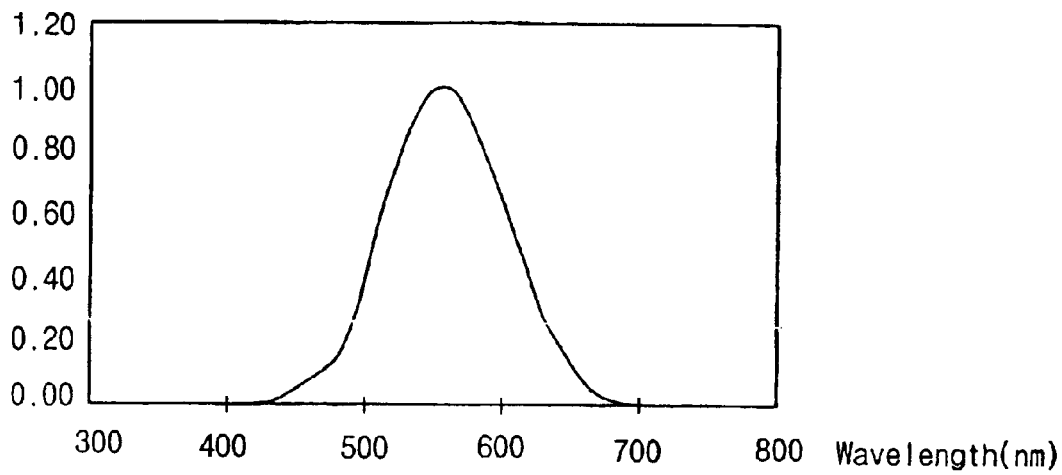
FIG. 3 is a graph showing eye sensitivity according to the wavelength.

FIG. 3 is a graph showing eye sensitivity according to the wavelength.

As shown in FIG. 3, the visible light is in the range of about 400 nm to 700 nm and the curve of eye sensitivity has its significant value in the range of about 500 nm to 600 nm.

Figure 4:
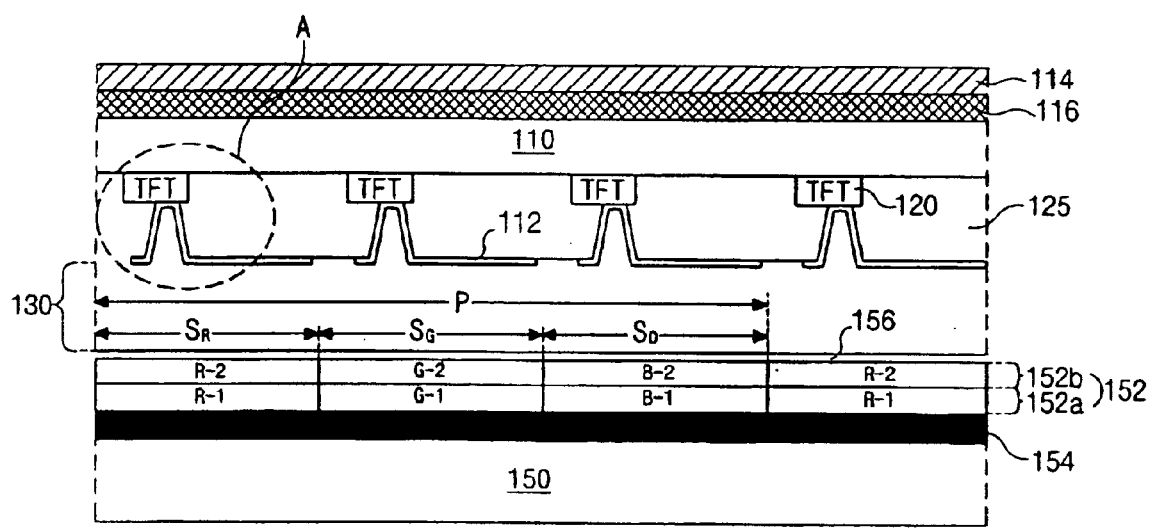
FIG. 4 is a schematic cross-sectional view of a reflective liquid crystal display device according to a first embodiment of the present invention.

FIG. 4 is a schematic cross-sectional view of a reflective liquid crystal display device that uses a cholesteric liquid crystal (CLC) color filter, according to a first embodiment of the present invention.

In FIG. 4, first and second substrates 110 and 150 are facing and spaced apart from each other, and a liquid crystal layer 130 is interposed therebetween. A polarizing plate 114 that transmits light whose axis coincides with the polarizing axis of the polarizing plate 114 is formed over an outer surface of the first substrate 110. A quarter wave plate (QWP) 116, which is a phase-difference plate, is interposed between the first substrate 110 and the polarizing plate 114. A plurality of thin film transistors 120 is formed beneath the first substrate 110.

Figure 5:
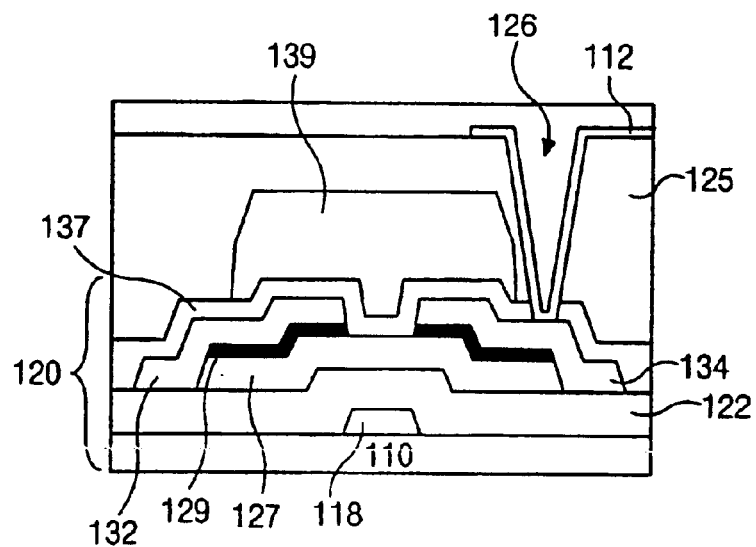
FIG. 5 is a cross-sectional view illustrating a structure of a thin film transistor of the present invention.

A process of forming the thin film transistor will be described hereinafter with reference to FIG. 5. FIG. 5 is a cross-sectional view illustrating a structure of a thin film transistor of the present invention. A horizontal gate line (not shown) and a gate electrode 118 that extends from the gate line (not shown) are formed on the first substrate 110 using conductive material such as metal. A gate insulating layer 122 is formed on the gate electrode 118 using inorganic insulating material such as silicon oxide ($SiO_2$) or silicon nitride ($SiN_X$), for example. An active layer 127 is formed on the gate insulating layer 122 that is over the gate electrode 118 using an amorphous silicon. Ohmic contact layer 129 is then formed on the active layer 127 using doped amorphous silicon. A data line (not shown), a source electrode 132 and a drain electrode 134 are formed over the ohmic contact layers 129 using conductive material such as metal. The data line (not shown) defines a pixel region "P" in FIG. 4 by crossing the gate line (not shown). The source electrode 132 extends from the data line (not shown). The drain electrode 134 is spaced apart from the source electrode 132. The gate electrode 118, the source electrode 132 and the drain electrode 134 form a thin film transistor. An inorganic insulating layer 137 is then formed on the whole substrate using inorganic insulating material such as silicon oxide ($SiO_2$) or silicon nitride ($SiN_X$), for example. A black matrix 139 is formed on a thin film transistor portion as shown in the figure to intercept incident light in the thin film transistor portion. A passivation layer 125 is formed on the source electrode 132 and the drain electrode 134 using organic insulating material such as benzocyclobutene (BCB) or acrylic resin, for example. A contact hole 126, which exposes the drain electrode 134 to the air is formed through the passivation layer 125. A pixel electrode, i.e., a first transparent electrode 112, is formed on the passivation layer 125 using transparent conductive material. The first transparent electrode 112 contacts the drain electrode 134 through the contact hole 126.

As shown in FIG. 4 again, the passivation layer 125 is formed on the thin film transistor 120 and beneath the first substrate 110. The first transparent electrode 112 is connected to each of the thin film transistor. Each of the thin film transistor 120 and the first transparent electrode 112 connected thereto corresponds to each of sub-color-filters $S_R$, $S_G$ and $S_B$ that will be described later. On the other hand, the plurality of thin film transistors, which correspond respectively to each of the sub-color filters, may alternatively be formed on the second substrate and connected to the corresponding second transparent electrode.

An absorption layer 154 is formed on the second substrate 150. A cholesteric liquid crystal (CLC) color filter layer 152 is then formed on the absorption layer 154. The cholesteric liquid crystal (CLC) color filter 152 has a double layered structure according to the first embodiment of the present invention. That is, the cholesteric liquid crystal (CLC) color filter 152 consists of a first cholesteric liquid crystal (CLC) color filter layer 152a and a second cholesteric liquid crystal (CLC) color filter layer 152b. Each of the cholesteric liquid crystal (CLC) color filter layers 152a and 152b has sub-color-filters $S_R$, $S_G$ and $S_B$, which are arranged in an alternating order of R, G and B. The first cholesteric liquid crystal (CLC) color filter layer 152a has a different central wavelength of the reflection for each of the sub-color filters $S_R$, $S_G$ and $S_B$ from the second cholesteric liquid crystal (CLC) color filter 152b. The sub-color-filters $S_R$, $S_G$ and $S_B$ are respectively for red, green and blue colors. Each of the sub color filters $S_R$, $S_G$ and $S_B$ selectively reflects light of a corresponding wavelength and transmits light of the other wavelength. A common electrode 156, i.e., a second transparent electrode, which applies the voltage to the liquid crystal layer 130, is formed on the CLC color filter layer 152. Because cholesteric liquid crystal (CLC) color filter layer of the present invention is formed in a double-layered structure of which the central wavelength of reflection in each of the sub-color filters $S_R$, $S_G$ and $S_B$ is different, the bandwidth of the reflection curve is extended in contrast with the bandwidth of the conventional single-layered cholesteric liquid crystal (CLC) color filter so that the reflective brightness can be increased. Consequently, since the bandwidth of the reflection curve of the reflective liquid crystal display device using a cholesteric liquid crystal (CLC) color filter is extended to the extent of that of conventional reflective liquid crystal display device, not only the color purity but also the reflective brightness can be increased. Furthermore, an opaque substrate can be applied as the second substrate since the LCD device is reflection type.

In a second embodiment, even though a cholesteric liquid crystal (CLC) color filter 160 has a single-layered structure, each of the sub-color filters $S_R$, $S_G$ and $S_B$ is divided into two regions in which the central wavelengths of reflection curve for one region is different from the other region.

Figure 6:
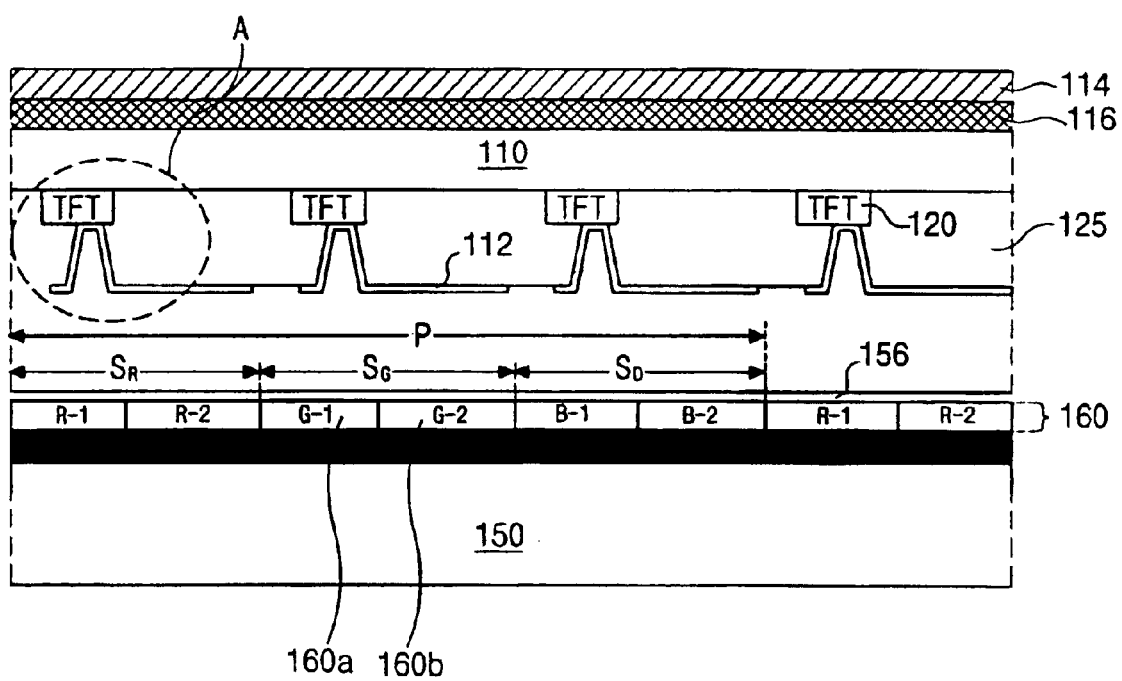
FIG. 6 is a schematic cross-sectional view of a reflective liquid crystal display device according to a second embodiment of the present invention.

FIG. 6 is a schematic cross-sectional view of a reflective liquid crystal display device according to a second embodiment of the present invention. The explanation coinciding with that of FIG. 4 will be omitted.

In FIG. 5, even though a cholesteric liquid crystal (CLC) color filter layer 160 is composed of only one layer different from the first embodiment, the reflective brightness can be increased due to first and second regions 160a and 160b of the sub-color filters $S_R$, $S_G$ and $S_B$. The central wavelengths of reflection in the first and second regions 160a and 160b of the sub-color filters $S_R$, $S_G$ and $S_B$ are slightly different from each other so that the reflective brightness can be increased. That is, the first regions R-1, G-1 and B-1 of each sub-color filter reflects light of the central wavelength range respectively for each color red, green and blue, and the second region R-2, G-2 or B-2 of each sub-color filter reflects light of other wavelength range respectively for each color red, green and blue. In case of sub-color filter $S_G$, for example, the first and second regions 160a and 160b of the sub-color filter $S_G$ have their own central wavelengths of reflection at about 530 nm and 570 nm, respectively. Even though the bandwidth of the reflection curve for the first and second regions 160a and 160b of the sub-color filter $S_G$ is respectively about 60 nm, the total bandwidth of reflection curve for sub-color filter $S_G$ is extended to about 100 nm due to the summation of bandwidths of the first and second regions 160a and 160b of the sub-color filter $S_G$. In case of sub-color filters $S_R$ and $S_B$, the bandwidths of reflection curve can be increased by applying the same method. Accordingly, reflectance of the reflective liquid crystal display device using a cholesteric liquid crystal (CLC) color filter is increased and the display of higher brightness can be realized under the same ambient light.

In another embodiment, each of the sub-color filters $S_R$, $S_G$ and $S_B$ can have three or more regions in which the central wavelengths for each region are different from each other. The reflective brightness can be increased by providing divided regions of the sub-color filters $S_R$, $S_G$ and $S_B$ whose central wavelength is in the range of high sensitivity of eye sensitivity graph (FIG. 3). For sub-color filter $S_R$, a plurality of regions of the sub-color filter $S_R$ having their central wavelengths in the range of about 620 nm to 650 nm can be applied. For sub-color filters $S_G$ and $S_B$, a plurality of regions of the sub-color filters $S_G$ and $S_B$ having their central wavelengths in the ranges of 530 nm to 570 nm and 440 nm to 480 nm can be applied, respectively. By this composition, the reflective brightness can be increased.

In a third embodiment, which is a combination of the first and second embodiments, the reflective brightness can be increased by dividing each of the sub-color filters $S_R$, $S_G$ and $S_B$ into two regions, a first region and a second region, and simultaneously forming a cholesteric liquid crystal (CLC) layer 170 in a double layered structure. Each region for each of the sub-color filters $S_R$, $S_G$ and $S_B$ in each cholesteric liquid crystal (CLC) color filter layer 170 can have same or different central wavelength. That is, the first and second regions R-1 and R-2 of the sub-color filter $S_R$ in a lower layer of the cholesteric liquid crystal (CLC) color filter layer may have a same central wavelength with the first and second regions R-3 and R-4 (or R-4 and R-3) respectively of the sub-color filter $S_R$ in an upper cholesteric liquid crystal (CLC) color filter layer. Moreover, the number of the regions for each of the sub-color filters $S_R$, $S_G$ and $S_B$ and the number of layers of the cholesteric liquid crystal (CLC) color filter can be more than two.

Figure 7:
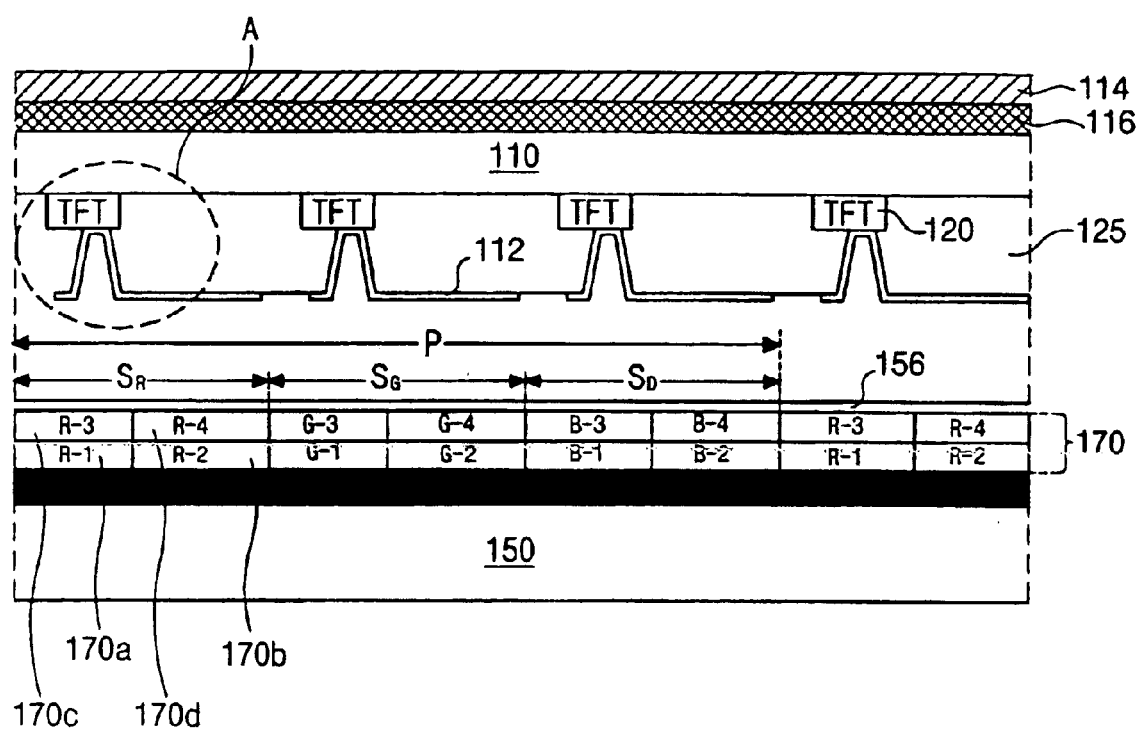
FIG. 7 is a schematic cross-sectional view of a reflective liquid crystal display device according to a third embodiment of the present invention.

FIG. 7 is a schematic cross-sectional view of a reflective liquid crystal display device according to a third embodiment of the present invention.

In FIG. 7, the cholesteric liquid crystal (CLC) color filter 170 is double layered and each sub-color filter $S_R$, $S_G$ and $S_B$ in each layer of the cholesteric liquid crystal (CLC) color filter 170 is divided into two portions, for example, vertically. That is, each sub-color filter $S_R$, $S_G$ and $S_B$ in the double-layered cholesteric liquid crystal (CLC) color filter 170 is divided into a first, second, third and fourth regions 170a, 170b, 170c and 170d whose central wavelengths of reflection are different from each other. Each of the sub-color filters $S_R$, $S_G$ and $S_B$ of the cholesteric liquid crystal (CLC) color filter layer 170 is divided into certain number of regions and the cholesteric liquid crystal (CLC) color filter layer 170 is multi-layered to keep the white balance and maximize the reflective brightness.

Consequently, a plurality of the regions of the sub-color filters $S_R$, $S_G$ and $S_B$ and the doubled layered cholesteric liquid crystal (CLC) color filter layer 170 are formed in a pixel to have different central wavelengths in corresponding ranges for R, G and B, and the bandwidth of the reflection curve is extended so that a reflective LCD device using a CLC color filter with improved reflective brightness can be provided.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. A reflective liquid crystal display device, comprising:
    first and second substrates facing and spaced apart from each other;
    a first transparent electrode beneath the first substrate;
    a light absorption layer on the second substrate;
    a cholesteric liquid crystal (CLC) color filter layer on the light absorption layer, the cholesteric liquid crystal color filter layer being multi-layered and each layer of the cholesteric liquid crystal color filter layer including sub-color filters for red, green and blue colors arranged in an alternating order, wherein each layer of the red sub-color filter reflects red light, each layer of the green sub-color filter reflects green light, and each layer of the blue sub-color filter reflects blue light;
    a second transparent electrode on the cholesteric liquid crystal color filter layer; and
    a liquid crystal layer interposed between the first and second transparent electrodes;
    wherein each layer of each respective sub-color filter has a different central reflection wavelength.

2. The reflective liquid crystal display device according to claim 1, further including a plurality of thin film transistors, which correspond respectively to each of the sub-color filters and are respectively connected to the corresponding first transparent electrode; and
    a passivation layer beneath the thin film transistor and the first substrate.

3. The reflective liquid crystal display device according to claim 1, further including a plurality of thin film transistors, which correspond respectively to each of the sub-color filters and are respectively connected to the corresponding second transparent electrode.

4. The reflective liquid crystal display device according to claim 1, further including a quarter wave plate on the first substrate and a polarizing plate on the quarter wave plate.

5. The reflective liquid crystal display device according to claim 1, wherein the cholesteric liquid crystal (CLC) color filter layer includes at least two layers.

6. The reflective liquid crystal display device according to claim 1, wherein the central wavelength of reflection for red color is between about 620 and about 650 nm, for green color between about 530 and about 570 and for blue color between about 440 and about 480.

7. A reflective liquid crystal display device, comprising:
    first and second substrates facing and spaced apart from each other;
    a first transparent electrode beneath the first substrate;
    a light absorption layer on the second substrate;
    a single cholesteric liquid crystal color filter layer on the light absorption layer, the cholesteric liquid crystal color filter layer including sub-color filters for red, green and blue colors arranged in an alternating order, each of the sub-color filters being divided into a plurality of regions;
    a second transparent electrode on the cholesteric liquid crystal color filter layer; and
    a liquid crystal layer interposed between the first and second transparent electrodes;
    wherein each region of each respective sub-color filter has a different central reflection wavelength.

8. The reflective liquid crystal display device according to claim 7, further including a plurality of thin film transistors, which correspond respectively to each of the sub-color filters and are respectively connected to the first transparent electrode; and a passivation layer beneath the thin film transistor and the first substrate.

9. The reflective liquid crystal display device according to claim 7, further including a plurality of thin film transistors, which correspond respectively to each of the sub-color filters and are respectively connected to the second transparent electrode.

10. The reflective liquid crystal display device according to claim 7, further comprising a quarter wave plate on the first substrate and a polarizing plate on the quarter wave plate.

11. The reflective liquid crystal display device according to claim 7, wherein the central wavelength of reflection for red color is between about 620 and about 650 nm, for green color between about 530 and about 570 and for blue color between about 440 and about 480.

12. A reflective liquid crystal display device, comprising:
- first and second substrates facing and spaced apart from each other;
- a first transparent electrode beneath the first substrate;
- a light absorption layer on the second substrate;
- a cholesteric liquid crystal color filter layer on the light absorption layer, the cholesteric liquid crystal color filter layer being multi-layered and each layer of the cholesteric liquid crystal (CLC) color filter layer including sub-color filters for red, green and blue colors arranged in an alternating order, each of the sub-color filters being divided into a plurality of regions;
- a second transparent electrode on the cholesteric liquid crystal color filter layer; and
- a liquid crystal layer interposed between the first and second transparent electrodes.

13. The reflective liquid crystal display device according to claim 12, further including a plurality of thin film transistors, which correspond respectively to each of the sub-color filters and are respectively connected to the first transparent electrode; and
- a passivation layer beneath the thin film transistor and the first substrate.

14. The reflective liquid crystal display device according to claim 12, further including a plurality of thin film transistors, which correspond respectively to each of the sub-color filters and are respectively connected to the second transparent electrode.

15. The reflective liquid crystal display device according to claim 12, further comprising a quarter wave plate on the first substrate and a polarizing plate on the quarter wave plate.

16. The reflective liquid crystal display device according to claim 12, wherein the cholesteric liquid crystal color filter layer includes at least two layers.

17. The reflective liquid crystal display device according to claim 12, wherein each region of each respective sub-color filter has a different central wavelength of reflection.

18. The reflective liquid crystal display device according to claim 17, wherein the central wavelength of reflection for red color is between about 620 and about 650 nm, for green color between about 530 and about 570 and for blue color between about 440 and about 480.

* * * * *